W. KRAMER.
FISHING REEL.
APPLICATION FILED OCT. 14, 1907.

1,013,942.

Patented Jan. 9, 1912.

3 SHEETS—SHEET 1.

Witnesses:
John R. Rennie
P. Margulies

Inventor
William Kramer
By his Attorney

W. KRAMER.
FISHING REEL.
APPLICATION FILED OCT. 14, 1907.

1,013,942.

Patented Jan. 9, 1912.
3 SHEETS—SHEET 2.

Witnesses:
John A. Rennie
P. Margulies

Inventor
William Kramer
By his Attorney

W. KRAMER.
FISHING REEL.
APPLICATION FILED OCT. 14, 1907.
1,013,942.
Patented Jan. 9, 1912.
3 SHEETS—SHEET 3.
Fig: 8.
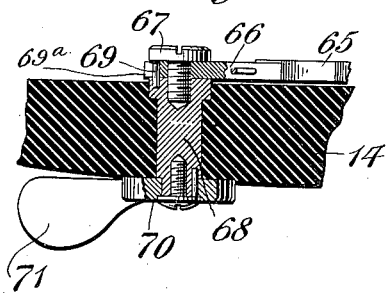
Fig: 9.
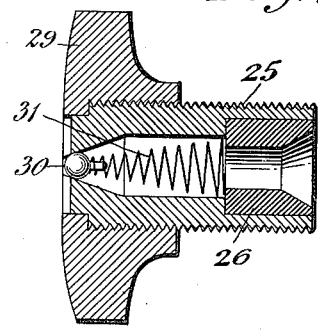
Fig: 10.
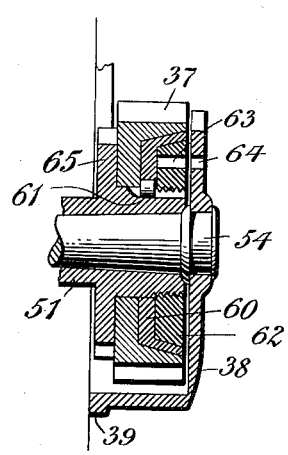
Fig: 11.
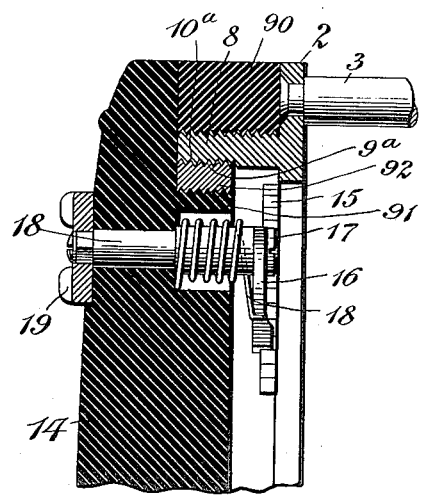
Witnesses:
John A. Pennie
P. Margulies.
Inventor
William Kramer
By his Attorney

UNITED STATES PATENT OFFICE.

WILLIAM KRAMER, OF BROOKLYN HILL, NEW YORK.

FISHING-REEL.

1,013,942.  Specification of Letters Patent.  Patented Jan. 9, 1912.

Application filed October 14, 1907. Serial No. 397,237.

*To all whom it may concern:*

Be it known that I, WILLIAM KRAMER, a citizen of the United States, and a resident of Brooklyn Hill, in the county of Queens and State of New York, have invented certain Improvements in Fishing-Reels, of which the following is a specification.

This invention relates to certain improvements in fishing reels such as are employed by anglers, and more particularly in that class of such devices whereof the reel shown and claimed in my prior Letters Patent, No. 783,842, dated February 28, 1905, is a type, and the object of the invention is to provide a reel of this general character of an improved and simplified construction, wherein the operative mechanisms are so combined and arranged as to be less liable to become deranged or broken during use, and whereby the improved reel is rendered capable of more convenient and effective assemblage and operation.

The invention consists in certain novel features of the construction, and combinations and arrangements of the several parts of the improved fishing reel, whereby certain important advantages are attained and the device is rendered simpler, less expensive, and otherwise better adapted and more convenient for use, all as will be hereinafter fully set forth.

The novel features of the invention will be carefully defined in the claims.

Figure 1:
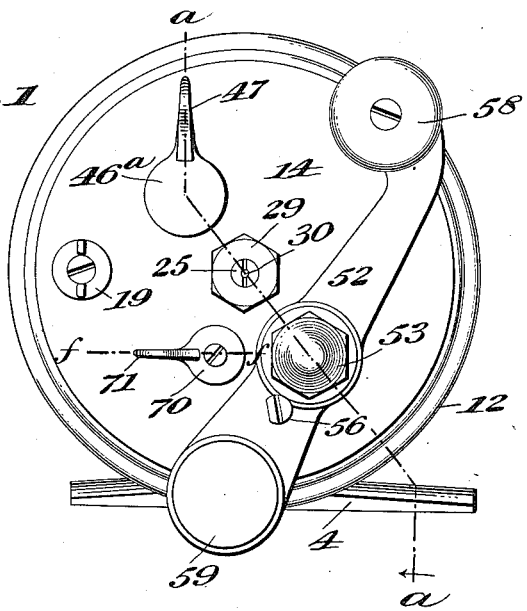
Figure 2:
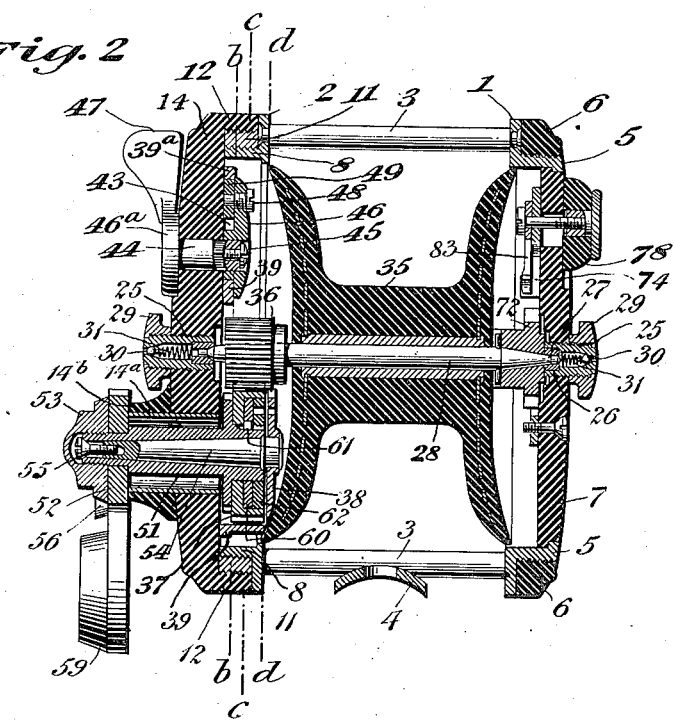
Figure 3:
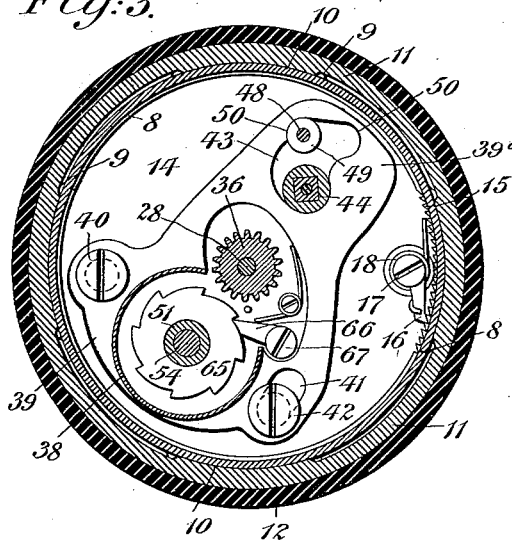
Figure 4:
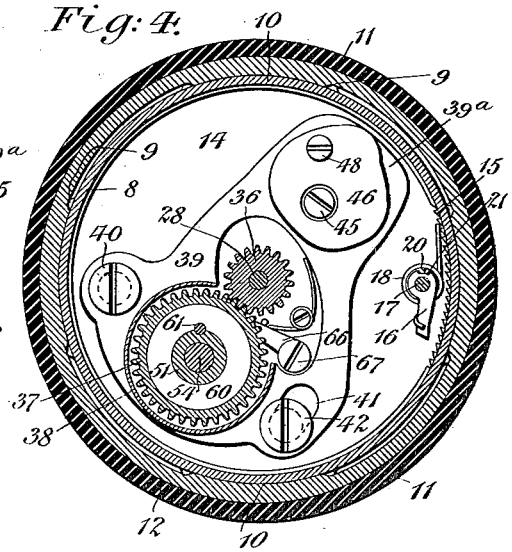
Figure 5:
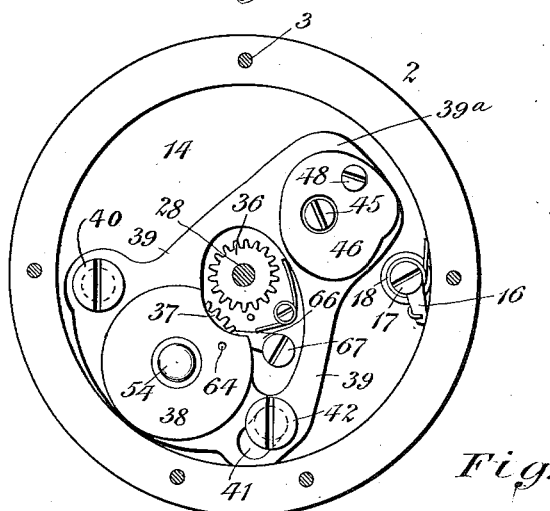
Figure 6:
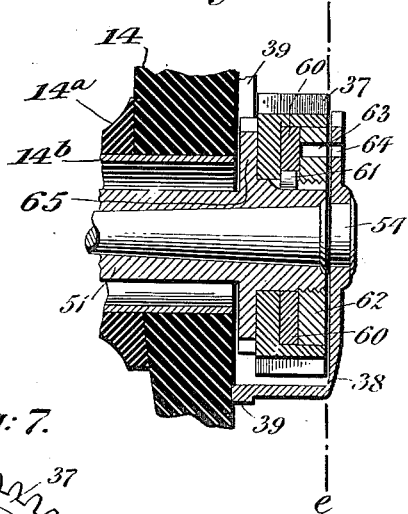
Figure 7:
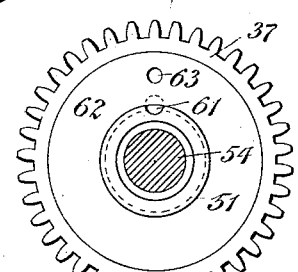

In the accompanying drawings which serve to illustrate my invention—Figure 1 is a side elevation of a reel embodying my improvements; Fig. 2 is a sectional view taken transversely through the improved reel in the broken plane indicated by the line *a—a* in Fig. 1; Fig. 3 is a cross section taken through the improved reel in the plane indicated by the line *b—b* in Fig. 2; Fig. 4 is a cross-sectional view similar to Fig. 3, but taken through the improved reel in the plane indicated by the line *c—c* in Fig. 2; Fig. 5 is another cross sectional view similar to Figs. 3 and 4, but taken through the improved reel in the plane indicated by the line *d—d* in Fig. 2, and showing the driving mechanism adjusted to a different position from that shown in Figs. 3 and 4; Fig. 6 is an enlarged fragmentary sectional view showing certain features of construction of the driving mechanism which will be hereinafter explained; Fig. 7 is a sectional detail view taken in the plane indicated by the line *e—e* in Fig. 6, and showing certain features of construction of the driving devices therein illustrated; Fig. 8 is an enlarged sectional detail view taken through one end wall of the improved reel in the plane indicated by the line *f—f* in Fig. 1, and showing certain features of construction of the detent device for holding the crank shaft of the driving mechanism against back rotation; Fig. 9 is an enlarged fragmentary section showing one of the bearings for the spool shaft of the improved reel; Fig. 10 is an enlarged sectional detail view showing a modified construction of the frictional driving connection for the spool shaft, and Fig. 11 is an enlarged sectional view showing a modified construction of the means for holding the end plate to the cage-like frame of the reel.

As shown in these views, the improved reel is provided with a metallic frame constructed in cage-like form with two annular bands or rings 1 and 2 spaced apart and connected together by means of tie-bars 3, arranged at suitable intervals the ends of the tie-bars 3, 3, being reduced and passed through the bands or rings 1 and 2, and being riveted upon the outer faces thereof to afford a rigid connection between the parts. 4 represents the usual concaved metal plate held upon the tie-rods 3 at one side of the reel for securing the device to the fishing rod.

The annular band or ring 1 at one end of the cage-like frame of the device is provided with an outwardly directed annular flange 5, which is exteriorly screw-threaded to receive upon its perimetral surface an annulus or ring 6 of hard rubber, while the inner surface of said annular flange 5 is provided with an annular shoulder against which is fitted an end plate 7 also formed from hard rubber, and which is tightly fitted within the said flange against its shouldered inner surface in such a manner as to securely close that end of the reel.

The annular band or ring 2 at the opposite end of the cage-like frame of the device is also provided with an outwardly directed annular flange 8, provided at intervals around its perimetral surface with mutilated screw-threads 9, 9 which are spaced apart in the manner illustrated in my above-mentioned Letters Patent so as to be adapted, when the parts of the reel are assembled, to receive between them reciprocal mutilated screw-threads 10, 10, produced interiorly within an annular member or ring 11 of metal, which is also provided with exterior screw threads fitting snugly within a correspondingly screw threaded internal surface produced within an annular edge flange 12 upon a hard rubber end plate 14, which is thus adapted to tightly close the end of the reel opposite to the end plate 7.

As in my before-mentioned Letters Patent, the end plate 14 is adapted to be turned relatively to the cage-like frame of the reel, after the sectional screw-threads 10 shall have been engaged between the sectional screw-threads 9, the respective sectional threads being thereby brought into engagement to lock the parts together until such time as said plate shall have been reversely turned to disengage the mutilated threads from each other, the said mutilated threads operating, when the parts are thus turned relatively one to the other, to draw the end plate 14 securely up to the cage-like frame of the device, but I have discovered that where this construction is employed, there is a liability of the end plate 14 being turned by accident in the reverse direction so as to disengage the screw threaded surfaces, and according to my present invention I have provided means of an improved and simplified construction for preventing such accidental turning, said means being, however, adapted for ready adjustment in and out of operative position so as to facilitate the removal of the end plate 14 when desired, and this means I will now proceed to describe.

15 represents a series of ratchet teeth provided upon the internal surface of the flange 8 of the annular end band or ring 2 of the cage-like frame of the device, and 16 represents a pawl or dog, provided with a spring the tension of which is normally exerted to hold said dog or pawl in engagement with said ratchet teeth 15. The pawl or dog 16 is pivotally held upon a screw 17 set in the inner end of a stud 18 which is passed through the end plate 14, from the inner side thereof, whereat the pawl or dog 16 is located, to the outer surface of said end plate, whereat said stud is provided with a thumb-piece 19 adapted to be turned by the user of the reel, to impart turning movement to said stud 18.

Means should be taken to shield the opening through which the stud 18 is passed against the entry of water which might damage the internal mechanism of the improved reel, and the inner end of the stud 18 carries an eccentric pin 20 which is engaged between spaced shoulders 21, 21 upon the dog or pawl 16, as clearly shown in Fig. 4 of the drawings, the arrangement of the parts being such that when the stud 18 is turned in one direction to cause its eccentric pin 20 to engage one of the shoulders 21 of the dog or pawl, said dog or pawl 16 will be swung pivotally upon its screw 17 and against the tension of its spring, out of position for engagement for the ratchet teeth 15 of the flange 8, as clearly shown in said Fig. 4, but when the stud is reversely turned, the eccentric pin 20 is withdrawn from engagement with said shoulder 21 so that the spring of the dog or pawl 16 is permitted to exert its tension to force the said dog or pawl into effective engagement with the ratchet teeth of the flange 8 of the cage-like member 2. By this arrangement it will be evident that when the end plate 14 is applied to the cage like member of the device, to close the end thereof, the mutilated threads 9 of the flange 8 being engaged between the corresponding mutilated threads 10 of the ring 11 carried by the end plate 14, and the parts being turned relatively one to the other to engage the respective mutilated screw-threads, the pawl or dog 16 carried by the end plate 14 will be caused to slip along the ratchet teeth 15 of the flange 8 of the cage-like frame of the device and will act to automatically prevent such backward rotation of the end plate 14 as would tend to disengage the mutilated screw-threads 9 and 10 from each other so that the accidental loosening of the end plate 14 during use of the improved reel is effectively prevented. But when access is desired to the internal mechanism of the improved reel, the thumb piece 19 at the outer surface of the end plate 14 may be turned so as to cause the dog or pawl 16 to be lifted from engagement with the ratchet teeth 15 of flange 8, whereupon the said end plate 14 may be readily and freely turned backward to disengage the mutilated screw-threads 9 and 10 and permit the said end plate 14 to be quickly detached from the cage-like frame of the device.

The opposite end plates 7 and 14 of the improved reel are provided, as shown in Figs. 2 and 9, with centrally located and alined bearing pieces 25, 25, which are externally screw-threaded for engagement with correspondingly screw-threaded apertures at the central parts of the respective end plates so that said bearing pieces may be adjusted toward and from each other in assembling the parts of the reel for securing accurate adjustment of the bearings 26, 26, wherein the journals 27, 27 at opposite ends of the spool shaft 28 are engaged to turn. Said bearings 26, 26, are preferably in the form of hardened steel cups, and as herein shown, the journals 27, 27, at the ends of the spool shaft 28 are coned to permit accurate adjustment of the parts at assemblage and to take up wear. Lock-nuts 29 are herein shown screwed upon the outer ends of the bearing pieces 25, 25, to hold them in secure adjusted position and also to prevent leakage of water between the parts, and the bearing pieces are provided with bores which afford communication from the exterior to the cups 26, 26, so that the same may be lubricated from time to time if desired. These bores are closed normally at their outer ends by means of ball valves 30, preferably of glass so that they may not be corroded by contact with water, and which are normally pressed into seated position by means of springs 31 in such a way as to prevent the entry of water or grit into the bearings.

The spool shaft 28 carries the spool 35 and at its end adjacent to the end plate 14, and at the inner side of said end plate a gear pinion 36, with which is adapted to be engaged a spur gear wheel 37, held within a shield or casing 38 produced upon a rocking frame 39 pivotally mounted upon a screw 40 for rocking movement which serves in a well known way to throw the gear wheel 37 into and out of mesh with the pinion 36 upon the spool shaft 28. The frame 39 is held to slide upon the inner surface of the end plate 14 in its rocking movements, and is provided, at its side opposite to the pivot screw 40 with a guide-slot 41 through which is passed a guide screw 42 carried by the end plate 14 and serving to hold the frame closely pressed to the surface of the said end plate.

The frame 39 is formed with an apertured portion through which the spool shaft 28 and its pinion 36 are passed, the aperture in the frame being of dimensions to permit said frame to be rocked without contact thereof upon the pinion, and at the side of the pinion 36 opposite to the shield or casing 38, the frame 39 has an extension 39$^a$ provided with an aperture 43 through which is extended a stud or shaft 44, which is fitted to turn within an opening in the end plate 14 and has secured to its outer end a head 46$^a$ provided with a projecting thumb piece 47 permitting said shaft or stud to be conveniently turned by the person using the improved reel.

The inner end of the stud or shaft 44 is herein shown as squared, and upon it is fitted and held in place by means of a screw 45, a metal plate 46, the surface of which is in accurate contact upon the surface of the frame extension 39$^a$ at the side thereof, opposite to the end plate 14, the dimensions of said plate 46 being such as to insure that the opening 43 in the frame extension 39$^a$ shall be completely closed and covered over at all times irrespective of the rocking movement imparted to the frame and said extension by means to be presently described. The plate 46 being fitted closely upon the inner face of the frame extension 39$^a$, and the head 46$^a$ at the outer end of the stud or shaft 44 being tightly fitted against the outer surface of the end plate 14, it will be seen that the construction serves to prevent the entry of water between the parts and also affords an auxiliary guide means for guiding the frame 39 in its rocking movement upon the end plate 14.

The plate 46 carries a screw 48 projecting within the opening 43 of the frame extension 39$^a$ and forming a pintle whereon turns a roller 49, which is set eccentrically with respect to the axis of the shaft or stud 44, and is adapted, in the turning movement imparted to said shaft or stud through the thumb piece 47 at the outer side of end plate 14, to be engaged upon one or the other of two oppositely set shoulders 50, 50, produced at opposite sides of the upper part of the opening 43 in the frame extension 39$^a$ whereby it will be seen that when the stud or shaft is turned by the operator in one direction, the roller 49 is caused to contact with one of said shoulders 50 and to rock the frame 39 pivotally in one direction upon the screw 40, as to the position shown in Fig. 4, for example, whereby the spur gear 37 is brought into mesh with the pinion 36 upon the spool shaft, and when said thumb piece 47 is actuated to turn the stud or shaft 44 in the opposite direction, the said roller 49 is caused to press against the opposite shoulder 50 of the frame extension 39$^a$ and to reversely rock said frame 39 to the position shown in Fig. 5, wherein the spur gear 37 is thrown out of mesh with the pinion 36 upon the spool shaft.

The spur gear 37 within the shield or casing 38 is capable of turning movement upon the inner end of an actuating sleeve 51, which has a tapered or conical bore wherein is fitted a similarly formed pin or stud 54, the inner end of which is secured at the central part of the shield or casing 38, while the smaller outer end thereof has an axial threaded opening in which is fitted a screw 55, the tapered head whereof is adapted for accurate contact in a seat produced at the outer end of the actuating sleeve 51, as clearly shown in Fig. 2. It will thus be seen that by tightening or loosening the screw 55, such wear as may occur between the sleeve 51 and its bearing pin or stud 54 may be readily and conveniently taken up.

The outer part of the actuating sleeve 51 is extended through a boss 14$^a$ at the outer side of the end plate 14, said boss being formed integrally or otherwise upon the end plate and being preferably provided, as shown in Fig. 2, with a metallic lining or reinforce 14$^b$, the bore of which is made sufficiently wide to permit the play of the actuating sleeve laterally in unison with the rocking frame 39 whereon its bearing pin or stud 54 is carried, and outside of the boss 14$^a$, said sleeve 51 has a squared portion whereon is fitted an actuating lever 52, one end whereof is provided in a well known way, with a crank handle 58, while the opposite end thereof is provided with a counterbalance 59.

Beyond the squared portion of the actuating sleeve 51 whereon the lever 52 is fitted, said end of the actuating sleeve has a screw-threaded portion wherewith is engaged a cap-nut 53, serving, when screwed in place to close the outer end of the actuating sleeve and protect the screw 55 and also to press the surface of lever 52 up against the outer edge portion of the boss 14ª to produce a tight joint and prevent the entry of water or grit between the parts, and said cap nut 53 is provided with a beveled edge flange with which is adapted to be engaged the beveled head of a screw 56, carried by the lever 52 and serving, when screwed into close contact with the beveled edge flange of the cap nut, to hold the latter securely against accidental turning so that the cap nut is prevented from being loosened or lost. The beveled head of screw 56 is mutilated at one side so as to permit of being the more readily turned out of engagement with the edge of the cap nut to permit the latter to be removed when desired without requiring the complete removal and possible loss of the locking screw.

The inner side surface of the spur gear 37 is recessed to produce a cavity wherein is arranged a friction disk 60, one side of which is adapted for accurate contact against the web of said spur gear, and this friction disk 60 is compelled to turn in unison with the actuating sleeve 51 by the interposition of a roller 61, which serves the purposes of a key for locking said disk to turn with the sleeve while permitting a certain degree of adjustment of the disk lengthwise along said sleeve. Inside the disk 60, the sleeve 51 has a screw threaded portion whereon is engaged a nut-like member or disk 62, which serves to hold said disk 60 pressed up into close frictional contact with the web of the spur gear 37 so as to cause said gear to normally turn in unison with the actuating sleeve 51, while permitting of free rotation of the spur gear upon said sleeve when excessive strain is imposed upon the line to rotate the spool and to turn said spur gear through the medium of the pinion 36.

The nut-like member or disk 62 has an aperture 63, which in the rotation of the sleeve 51 is adapted to be moved into registry with a similar opening 64 in the shield or casing 38, whereupon a pin or tool of any kind may be inserted to hold the nut-like member to the shield or casing, so that upon further turning the sleeve 51 by means of the actuating lever 52 said nut-like member 62 may be caused to screw in one or the other direction along the sleeve to increase or diminish the frictional force exerted by the disk 60 against the web of the spur gear so that greater or less strain upon the line will be required to turn the spur gear relatively to the actuating sleeve. This arrangement of the spur gear 37 with the frictional driving connection with the actuating sleeve constitutes an effective drag which may be adjusted by the angler to meet different requirements, and the arrangement of said frictional connection is such as to effectually prevent breakage of the line in case the same be subjected to sudden and excessive strain, since it will be obvious that under such circumstances the spur gear will slip upon the actuating sleeve until such excessive strain shall have ceased. In this way provision is made for accommodating the reel automatically to give out the line during dashes of the fish while at the same time the actuating means is left under full control of the angler so that the line may be immediately reeled upon the tiring of the fish.

65 represents a ratchet wheel integrally produced upon the actuating sleeve 51 between the end plate 14 and the spur gear 37, with its teeth adapted to be engaged with a pawl or detent 66, pivoted by means of a screw 67 upon the inner end of a stud 68 mounted to turn in the end plate 14 similarly to the stud 18. The construction and arrangement of these parts will be understood by reference to Figs. 1, 3, 4, 5 and 8. The detent 66 is provided with a spring the tension of which is exerted to hold said detent normally in engagement with the teeth of the ratchet wheel 65, but upon turning of a button 70, provided with a thumb-piece 71 and located upon the outer end of stud 68 at the outer side of the end plate 14, a pin 69 upon the inner end of said stud is brought into engagement with a shoulder 69ª upon the detent 66 and serves to lift said detent, against the tension of its spring, out of contact with the teeth of ratchet wheel to the position shown in Fig. 4. By this arrangement the drag may be conveniently adjusted out of operation when, for example, the pole is left by the angler, the actuating sleeve 51 being thereupon permitted to turn freely so that the drag is held out of operation to permit the line to be freely drawn from the spool in case of a sudden dash of the fish.

72 represents a click wheel secured upon the end of the spool shaft opposite to the pinion 36 which is engaged by the click pawl 74 adapted to be raised by the lifting dog or pawl 83 and the operation of this click wheel 72 is controlled through the operation of the thumb piece 78. This structure, however, forms no particular part of my present invention.

From the above description it will be seen that the improved fishing reel constructed according to my invention is of an extremely simple and comparatively inexpensive nature and is particularly well adapted for use by anglers by reason of the strength and closeness of its construction and also on account of the convenience with which the several mechanisms may be adjusted in and out of operation and of the automatic character of the operation attained by several of said mechanisms, and it will also be obvious from the above description that the device is susceptible of considerable change without material departure from the principles and spirit of the invention and for this reason I do not desire to be understood as limiting myself to the precise form and arrangement of the several parts herein set forth in carrying out my invention in practice. For example, in some cases it may be desirable to employ the modified construction of frictional driving connection shown in Fig. 10, wherein the cavity or recess in the spur gear 37 is formed with a tapered or conical outer surface upon which a correspondingly formed perimetral surface of the disk 60 is adapted to bear frictionally. In Fig. 11 I have also shown a modified formation of the detachable connection between the cage-like frame of the reel and the end plate 14, the projecting flange 8 of the end band or ring 2 of the frame having external screw threads to receive an annular band or ring 90 of hard rubber similar to the band or ring 6 at the opposite end of the reel frame. In this construction the end plate 14 has a shouldered part 91 whereon is held, by means of screw threads, a metal ring or band 92 of a diameter to fit within the flange 8 of the end band or ring 2 of the cage like frame. The inner surface of the flange 8 is herein shown provided with mutilated threads 10$^a$ of the construction above described and adapted to coact with corresponding mutilated screw threads 9$^a$ upon the metal ring 92 of the end plate to hold the parts detachably together.

Having thus described my invention, what I claim and desire to secure by Letters Patent is—

1. A fishing reel having two members, one of which is a frame and the other an end piece, said members being provided with devices adapted for engagement upon turning of one member relatively to the other, to hold the members in relation; an internal flange having teeth provided on its edge carried by the frame, a spring pawl to engage the teeth on the flange of the frame to automatically lock the end piece against backward movement with relation to the frame, a stud rotatively mounted in the end piece acting as a pivot for the pawl, means for rotating the stud, and means carried by the stud contacting with the pawl to disengage the pawl from the teeth upon rotation of the stud.

2. A fishing reel having two members, one of which is a frame and the other an end piece, said members being provided with devices adapted for engagement upon turning of one member relatively to the other, to hold the members in relation; an internal flange having teeth provided on its edge carried by the frame, a spring pawl to engage the teeth on the flange of the frame to automatically lock the end piece against backward movement with relation to the frame, a stud rotatively mounted in the end piece acting as a pivot for the pawl, means for rotating the stud, said pawl having a shoulder formed in its edge adjacent the stud, and a pin carried by the stud to contact with the shoulder to disengage the pawl from the teeth upon rotation of the stud.

3. A fishing reel having two members, one of which is a frame and the other an end piece, said members being provided with devices adapted for engagement upon turning of one member relatively to the other, to hold the members in relation, an internal flange having teeth carried by the frame, a spring pawl pivoted to the end piece to engage the teeth on the flange of the frame to automatically lock the end piece against backward movement with relation to the frame, a stud rotatively mounted in the end piece acting as a piece for the pawl, means for rotating the stud and an eccentric pin carried by the stud to contact with the shoulder to disengage the pawl from the teeth upon rotation of the stud.

In witness whereof I have hereunto signed my name this 5th day of October, 1907, in the presence of two subscribing witnesses.

WILLIAM KRAMER.

Witnesses:
J. L. COPLINGER,
F. W. WIMAN.